(12) United States Patent
Im et al.

(10) Patent No.: US 9,495,992 B2
(45) Date of Patent: Nov. 15, 2016

(54) HOLOGRAPHIC DATA REPRODUCTION APPARATUS AND METHOD THEREOF

(71) Applicant: Foundation of Soongsil University-Industry Cooperation, Seoul (KR)

(72) Inventors: Sungbin Im, Seongnam-si (KR); Sunho Kim, Ansan-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 14/896,890

(22) PCT Filed: Aug. 7, 2013

(86) PCT No.: PCT/KR2013/007142
§ 371 (c)(1),
(2) Date: Dec. 8, 2015

(87) PCT Pub. No.: WO2015/005520
PCT Pub. Date: Jan. 15, 2015

(65) Prior Publication Data
US 2016/0118074 A1 Apr. 28, 2016

(30) Foreign Application Priority Data

Jul. 9, 2013 (KR) .......................... 10-2013-0080231

(51) Int. Cl.
*G11B 7/00* (2006.01)
*G11B 7/0065* (2006.01)
*G11B 20/10* (2006.01)

(52) U.S. Cl.
CPC ....... *G11B 7/0065* (2013.01); *G11B 20/10268* (2013.01)

(58) Field of Classification Search
CPC . G11B 7/0065; G11B 7/083; G11B 7/00781; G11B 20/10268
USPC .......... 369/103, 120, 112.23, 109.01, 112.15
See application file for complete search history.

(56) References Cited

U.S. PATENT DOCUMENTS

| 8,446,808 B2 * | 5/2013 | Ayres | G11B 7/0065 369/103 |
|---|---|---|---|
| 2003/0152274 A1 | 8/2003 | McGrew | |

FOREIGN PATENT DOCUMENTS

| JP | 2009-026386 A | 2/2009 |
|---|---|---|
| JP | 2009-086248 A | 4/2009 |
| JP | 2010-040161 A | 2/2010 |
| JP | 4863947 B2 | 1/2012 |
| KR | 10-1998-0044999 A | 9/1998 |
| KR | 10-2005-0059591 A | 6/2005 |

OTHER PUBLICATIONS

Sunho Kim et al., "An Evolutionary Algorithm to the Threshold Detection Method for the M-ary Holographic Data Storage", TCLab School of Electronic Engineering, Soongsil University, Seoul, Republic of Korea (published Oct. 2, 2012).

* cited by examiner

*Primary Examiner* — Nabil Hindi
(74) *Attorney, Agent, or Firm* — Novick, Kim & Lee, PLLC; Sang Ho Lee (57) ABSTRACT

A holographic data reproduction apparatus is provided. The holographic data reproduction apparatus includes: a charged-coupled device (CCD) that photographs diffracted-light from a recording medium irradiated with reference light, wherein the diffracted-light corresponds to a data page, an operation unit that calculates an optimal threshold value by applying a fitness function (Fit) to a genetic algorithm for detecting a number of error bits of the data page corresponding to the diffracted-light, a control unit that determines an output value of each pixel of the data page based on the optimal threshold value, and a decoding unit that decodes and outputs reproduction data according to the output value of the each pixel. Accordingly, it is possible to minimize a bit error rate (BER) and accurately reproduce holographic data.

11 Claims, 5 Drawing Sheets

HOLOGRAPHIC DATA REPRODUCTION APPARATUS AND METHOD THEREOF

CROSS-REFERENCE TO RELATED APPLICATION

This application claims priority to and the benefit of Korean Patent Application No. 10-2013-0080231, filed on Jul. 9, 2013, the disclosure of which is incorporated herein by reference in its entirety.

FIELD OF THE INVENTION

The present invention relates to a holographic data reproduction apparatus and a method thereof capable of reproducing holographic data by applying an optimal threshold value calculated using a genetic algorithm.

BACKGROUND TECHNOLOGY

In general, a data recording and reproduction apparatus using a hologram records and reproduces information in a recording medium using a diffraction of light and interference effects of light, and generally uses an interference pattern generated due to an interference between signal light and reference light. The interference pattern (that is, holographic data) formed in this manner is recorded in the recording medium When the recording medium in which the interference pattern has been stored is irradiated with the reference light, the interference pattern stored in the recording medium is reproduced, and recorded data is reproduced.

In this case, the holographic data recorded in the recording medium can be read using only the reference light used in a recording process. The holographic data is not read using reference light having a different wavelength or phase from the reference light used at the time of recording, and such reference light passes through the holographic data recorded in the recording medium. By recording and multiplexing a large amount of holographic data at the same place of the recording medium with different reference light using such properties of the hologram, a large amount of data can be stored in a small recording medium. Here, the data is processed in units of predetermined pages. Data in page units is called a data page, and the data page includes a plurality of pixels represented by data bits.

In particular, in the case of a holographic recording medium, two-dimensional inter symbol interference ((2D-ISI) due to a diffraction effect caused by recording light source interference) mainly degrades storage quality according to characteristics that data is processed in units of pages.

Meanwhile, when data recorded on the recording medium is reproduced, a bit error rate (BER; a failure rate of restoration to original data) should be reduced such that the data can be reproduced without being lost. However, when multiplexed holographic data is reproduced, a probability of erroneous bit detection increases due to the two-dimensional inter symbol interference described above and a narrow data page detection area.

Conventionally, for accurate data reproduction, a preset threshold value is applied en bloc so as to determine an output value of each pixel. Accordingly, there is a problem in which accuracy is degraded in data reproduction.

SUMMARY OF INVENTION

Technical Problem

An aspect of the present invention relates to a holographic data reproduction apparatus and a method for minimizing a bit error rate (BER) and accurately reproducing holographic data by applying an optimal threshold value calculated using a genetic algorithm.

Solution to Problem

A holographic data reproduction apparatus according to an embodiment of the present invention for achieving the above object may include a CCD that photographs diffracted-light corresponding to a data page from a recording medium irradiated with reference light, an operation unit that applies a fitness function (Fit) for detecting a number of error bits of the data page corresponding to the diffracted-light to a genetic algorithm to calculate an optimal threshold value, a control unit that determines an output value of each pixel of the data page based on the calculated optimal threshold value, and a decoding unit that decodes and outputs reproduction data according to the determined output value of each pixel.

The holographic data reproduction may further include a storage unit that stores a plurality of preset threshold values for determining an output value of each pixel of the data page, the operation unit may set a generation set including a population set that is set according to each pixel of the data page and a plurality of threshold values preset for each pixel, repeatedly perform a generation set selection, a crossover operation, and a mutation operation, and end the genetic algorithm when the number of generated child generations is equal to a preset number of generation evolutions.

Further, the operation unit may apply the plurality of stored threshold values as an initial value of a variable (Ri) of the population set to generate a parent generation, and calculate the fitness function for the parent generation.

Further, the operation unit may perform the crossover operation on the parent generation to generate a child generation, and apply a mutation probability to the generated child generation to calculate a fitness function.

Further, the operation unit may determine a generation having a smallest value among values of the fitness functions calculated in the parent generation and the child generation to determine a shift in generation.

Further, the operation unit may generate a new child generation from the parent generation having the smallest value when the smallest value is calculated in the parent generation, and set the child generation having the smallest value as a parent generation to generate a new child generation when the smallest value is calculated in the child generation.

When the genetic algorithm ends, the control unit may set a variable (Ri) of the generation in which the smallest value is calculated as an optimal threshold value, compare the optimal threshold value with a calculated luminance value, and determine the threshold value close to the calculated luminance value as an output value.

Further, the operation unit may calculate the fitness function (Fit) for the data page using an equation below.

$$\mathrm{Fit}(Ri) = \mathrm{count}(\mathrm{Error}/\mathrm{page}). \qquad \text{[Equation 1]}$$

Here, Ri denotes a population set variable of the genetic algorithm, page denotes the data page, Error denotes an error bit in the data page to which a value of the variable Ri is applied, and count ( ) denotes the number of measurements.

Further, the operation unit may calculate a luminance value for each pixel of the data page corresponding to the diffracted-light, and the control unit may compare the calculated luminance value with the value of the variable (Ri), and determine that a bit in the data page is an error bit when a value of a difference between the values is equal to or greater than a fixed value.

Meanwhile, a holographic data reproduction method of a holographic data reproduction apparatus according to an embodiment of the present invention may include the steps of: (a) photographing diffracted-light corresponding to a data page from a recording medium irradiated with reference light, (b) applying a fitness function (Fit) for detecting the number of error bits of the data page corresponding to the diffracted-light to a genetic algorithm to calculate an optimal threshold value, (c) determining an output value of each pixel of the data page based on the calculated optimal threshold value, and (d) decoding and outputting reproduction data according to the determined output value of each pixel.

Further, step (b) includes the steps of: (b1) setting a generation set including a population set that is set according to each pixel of the data page and a plurality of threshold values preset for each pixel, (b2) applying the plurality of preset threshold values as an initial value of a variable (Ri) of the population set to generate a parent generation, and calculating a fitness function for the parent generation, (b3) performing a crossover operation on the parent generation to generate a child generation, (b4) applying a mutation probability to the generated child generation to calculate a fitness function, and (b5) determining a generation having a smallest value among values of the fitness functions calculated in the parent generation and the child generation to determine a shift in generation.

Further, step (b5) may include the steps of: generating a new child generation from the parent generation having the smallest value when the smallest value is calculated in the parent generation, and setting the child generation having the smallest value as a parent generation to generate a new child generation when the smallest value is calculated in the child generation.

Further, step (b) may include the steps of: (b6) ending the genetic algorithm when the number of generated child generations is equal to a preset number of generation evolutions, and repeatedly performing steps b4 and b5 when the numbers are not equal to each other, and (b7) when the genetic algorithm ends, setting a variable (Ri) of the generation in which the smallest value is calculated as an optimal threshold value.

Further, step (c) may include comparing the optimal threshold value with a calculated luminance value, and determining the threshold value close to the calculated luminance value as an output value.

Further, the fitness function (Fit) for the data page may be calculated using an equation below.

$$\text{Fit}(Ri) = \text{count}(\text{Error/page}),\quad\text{[Equation]}$$

where Ri denotes a population set variable of the genetic algorithm, page denotes the data page, Error denotes an error bit in the data page to which a value of the variable Ri is applied, and count ( ) denotes the number of measurements.

Further, the holographic data reproduction method may further include the steps of: calculating a luminance value for each pixel of the data page corresponding to the diffracted-light, and comparing the calculated luminance value with the value of the variable (Ri) and determining that a bit in the data page is an error bit when a value of a difference between the values is equal to or greater than a fixed value.

Advantageous Effects of Inventions

According to an aspect of the present invention, it is possible to minimize a bit error rate (BER) and accurately reproduce holographic data by applying the optimal threshold value calculated using the genetic algorithm.

It is possible to reduce the complexity of implementation by limiting or adjusting the number of generation evolutions that are performed to obtain an optimized solution of the threshold value using the genetic algorithm. Accordingly, it is possible to simplify a configuration of the holographic data reproduction apparatus and reduce power consumption.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, a configuration and an operation of an embodiment of the present invention will be described with reference to the accompanying drawings.

Hereinafter, preferred embodiments of the present invention will be described with reference to the accompanying drawings. When components in the drawings are denoted with reference numerals, the same components are denoted with the same reference numerals even when the components are shown in different drawings.

Figure 1:
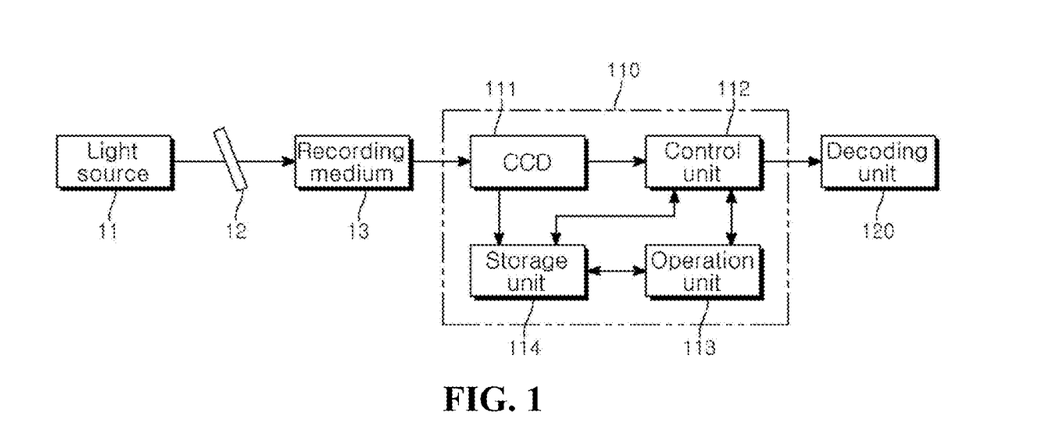
FIG. 1 is a schematic control block diagram of a holographic data reproduction apparatus according to an embodiment of the present invention.

FIG. 1 is a schematic control block diagram of a holographic data reproduction apparatus according to an embodiment of the present invention. Referring to FIG. 1, a holographic data reproduction apparatus (not shown) may include a light detection unit 110 and a decoding unit 120. The light detection unit 110 may include a charge coupled device ("CCD") 111, a control unit 112, an operation unit 113, and a storage unit 114.

When reference light for data reproduction separated by an optical splitter (not shown) is incident on a recording medium 13 through a mirror 12, a recorded interference pattern diffracts the incident reference light for reproduction in the recording medium 13, and diffracted-light corresponding to the data page is sent to the CCD 111. The CCD 111 may photograph the diffracted-light and represent a luminance value of each pixel included in the data page in binary bits.

The storage unit 114 stores a plurality of preset threshold values for determining an output value of each pixel of the captured data page. Here, the output value may be a luminance value output when the data page is reproduced. The stored threshold values may be stored in a table format.

Specifically, a plurality of reference threshold values may be included for one pixel for distortion correction of the captured data page, and each reference threshold value may be stored in its respective reference table. The respective threshold values of the reference tables may be set as different values.

The control unit 112 may control the operation unit 113 such that the operation unit 113 may calculate an optimal threshold value using the luminance value of each pixel of the data page captured by the CCD 111, the reference threshold value of the reference table, and the genetic algorithm. Here, the threshold values may be multi-leveled, and when the data page is reproduced in four levels, the reference threshold value and the optimal threshold value may have four levels, that is, may have four different luminance values. Meanwhile, in an exemplary embodiment, a holographic data reproduction apparatus that reproduces holographic data using a 4-level threshold value may be described.

The operation unit 113 may calculate the luminance value for each pixel of the data page captured by the CCD 111, and store the luminance value in the storage unit 114. Further, the operation unit 113 may apply a fitness function (Fit) for detecting a number of error bits of the data page corresponding to the diffracted-light to the genetic algorithm to calculate the optimal threshold value. Meanwhile, the fitting function is as shown in Equation 1 below.

$$\text{Fit}(Ri)=\text{count}(\text{Error}/\text{page}) \quad \text{[Equation 1]}$$

Here, Ri denotes a population set variable of the genetic algorithm, page denotes the data page, Error denotes an error bit in the data page to which a value of the variable Ri is applied, and count ( ) denotes the number of measurements.

Meanwhile, the control unit 112 may compare the calculated luminance value with the value of the variable Ri, and determine that a bit in the data page is an error bit when the values do not match. Here, the variable Ri is a population set in a generation set that is set in the genetic algorithm, and may be a plurality of variables. As an initial variable Ri of the genetic algorithm, the reference threshold value stored in the storage unit 114 may be applied.

Figure 2:
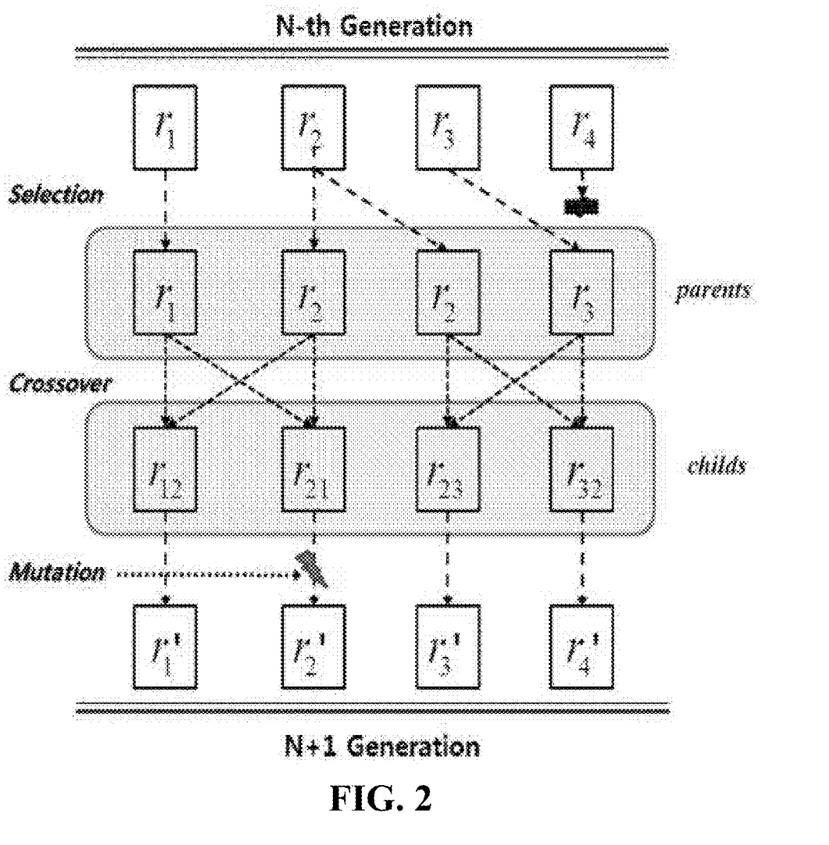
FIG. 2 is a diagram illustrating a genetic algorithm used in data reproduction in the holographic data reproduction apparatus according to an embodiment of the present invention.

Calculation of the optimal threshold value in the operation unit 113 will be described in detail with reference to FIG. 2. FIG. 2 is a diagram illustrating the genetic algorithm used for data reproduction in the holographic data reproduction apparatus according to an embodiment of the present invention.

Referring to FIG. 2, the operation unit 113 sets a generation set including a population set that is set according to each pixel of the data page and a plurality of threshold values preset for each pixel. In this embodiment, the variable Ri of the population set includes R1 to R4, but the number of Ri is not limited thereto and the variable Ri may include more variables. Here, the generation set may be a parent generation (parents) and a child generation (childs) in the genetic algorithm, and the population set may be a set of variables Ri included in each generation set.

Referring to FIG. 2, generation set selection, crossover, and mutation operation processes are repeatedly performed. When the number of generated child generations (childs) is equal to a preset number of generation evolutions, the genetic algorithm may end. Specifically, the operation unit 113 applies the plurality of stored threshold values as the initial value of the variable Ri of the population set to generate a parent generation (parents). Here, the generation of the parent generation (parents) may be selected using a roulette wheel scheme. In this case, a relatively higher selection probability may be imparted to variables r2 and r3 than variables r1 and r4 to maximize accuracy of the selection.

Meanwhile, the operation unit 113 calculates a fitness function for the generated parent generation (parents). Specifically, the operation unit 113 calculates the number of error bits by applying r1, r2, and r3 as the threshold value of each pixel of the captured data page.

Further, the operation unit 113 executes a crossover operation on the parent generation (parents) to generate a child generation (childs), and applies a mutation probability to the generated child generation (childs) to calculate a fitness function. Specifically, the operation unit 113 applies r12, r21, r23, and r32 as the threshold value of each pixel of the captured data page to calculate the number of error bits.

Here, as the mutation probability, a value of a binary length of 1/generation set may be used. Accordingly, it is possible to prevent local minimization or local maximization problems. Meanwhile, in the crossover operation, a uniform distribution crossover method may be applied.

The operation unit 113 may determine a generation having a smallest value among values of the fitness functions calculated in the parent generation (parents) and the child generation (childs) to determine a shift in generation. Specifically, when the smallest value is calculated in the parent generation (parents), the operation unit 113 may generate a new child generation (childs) from the parent generation (parents) having the smallest value. Meanwhile, when the smallest value is calculated in the child generation (childs), the operation unit 113 may set the child generation (childs) having the smallest value as the parent generation (parents) and generate a new child generation (childs).

Meanwhile, when the number of generated child generations (childs) is equal to the preset number of generation evolutions, the operation unit 113 may end the genetic algorithm. When the genetic algorithm ends, the operation unit 113 may set the variable Ri of the generation in which the smallest value has been calculated, as an optimal threshold value.

The control unit 112 may determine an output value of each pixel in the data page based on the optimal threshold value calculated using the genetic algorithm. Specifically, the control unit 112 may compare the optimal threshold value with the calculated luminance value to determine the optimal threshold value close to the calculated luminance value, as an output value.

Further, the decoding unit 120 may decode and output reproduction data according to the determined output value of each pixel.

Figure 3:
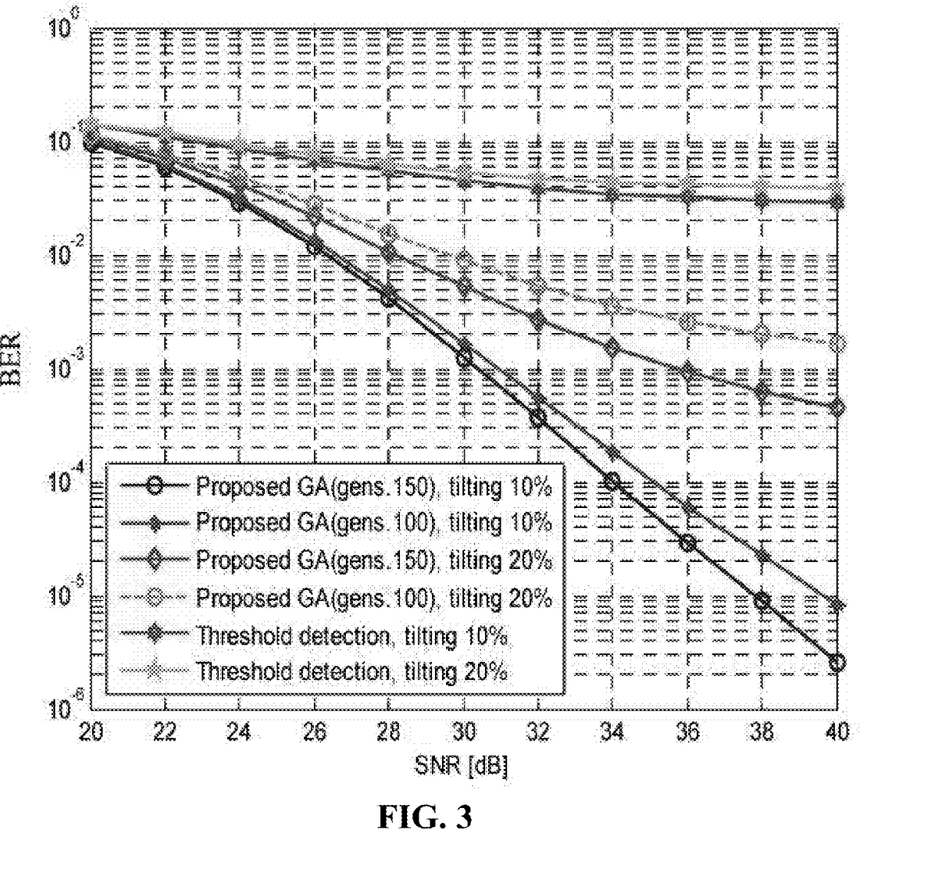
FIG. 3 is a graph in which bit error rates (BERs) of the holographic data reproduction apparatus according to an embodiment of the present invention are compared.

Meanwhile, FIG. 3 is a graph in which bit error rates (BERs) of the holographic data reproduction apparatus according to an embodiment of the present invention are compared. Referring to FIG. 3, a 4-ary data page includes 1000×1000 pixels, a blur factor deviation is 0.7, and the number of generation sets is set to 100 or 150.

Further, a bit error rate according to a conventional threshold value is compared with the bit error rate according to the optimal threshold value using the genetic algorithm of the present invention. It can be confirmed that the bit error rate according to the present invention is rapidly reduced. Thus, it is possible to accurately reproduce the holographic data.

Figure 4:
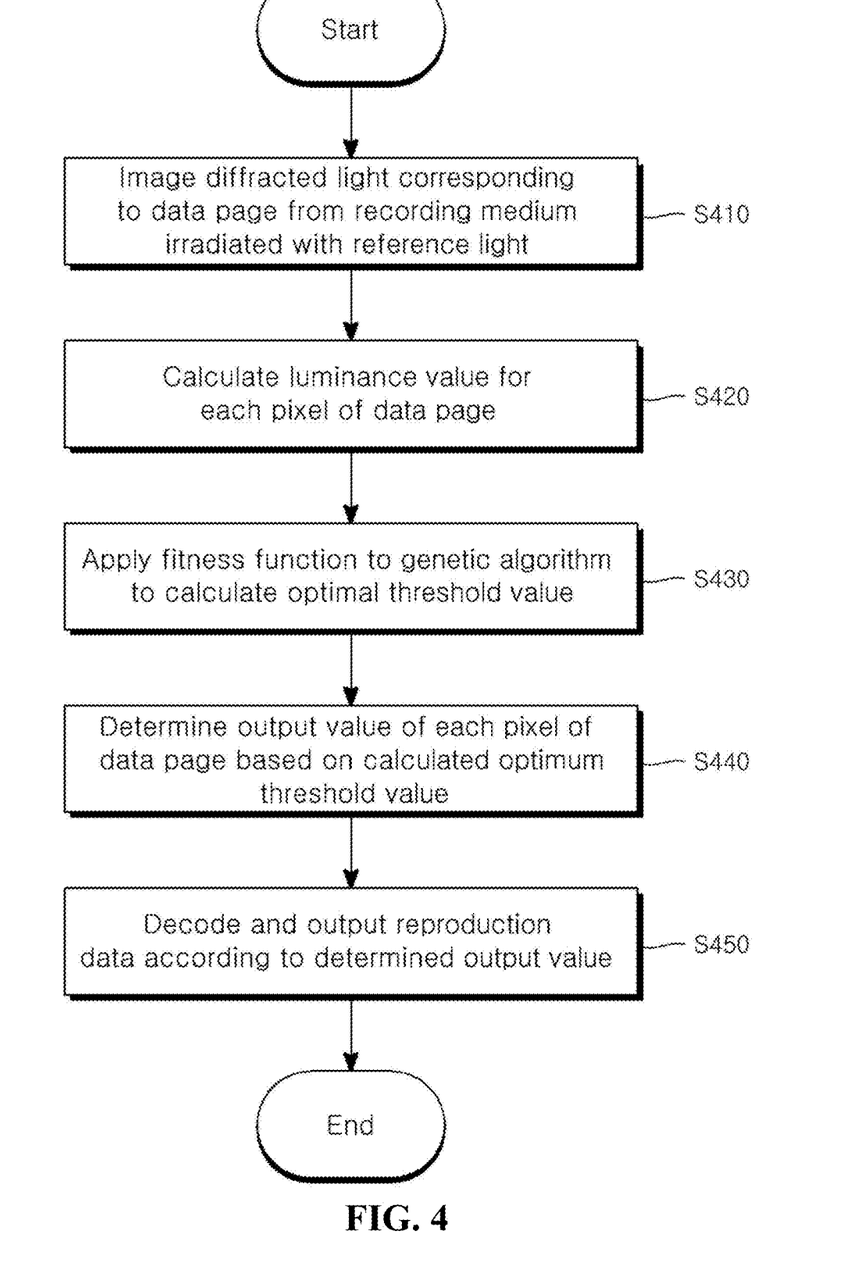
FIG. 4 is a flowchart illustrating a data reproduction method of the holographic data reproduction apparatus according to an embodiment of the present invention.

FIG. 4 is a flowchart illustrating a data reproduction method of the holographic data reproduction apparatus according to an embodiment of the present invention. Referring to FIG. 4, diffracted-light corresponding to the data page may be photographed from a recording medium irradiated with reference light (S410).

The luminance value for each pixel of the data page corresponding to the diffracted-light may be calculated (S420), and a fitness function (Fit) for detecting the number of error bits of the data page may be applied to the genetic algorithm to calculate an optimal threshold value (S430). Meanwhile, the fit function may be calculated using Equation 1.

$$\text{Fit}(Ri) = \text{count}(\text{Error}/\text{page}) \qquad \text{[Equation 1]}$$

Here, Ri denotes the population set variable of the genetic algorithm, page denotes the data page, Error denotes an error bit in the data page to which the value of the variable Ri has been applied, and count ( ) denotes the number of measurements.

For example, when the population set variables of the generation generated using the genetic algorithm are R1, R2, R3, and R4, the luminance value calculated for each pixel of the captured data page is compared with the respective variables R1, R2, R3, and R4. When the variable close to the calculated luminance value is R1, a value of a difference between the value of R1 and the calculated luminance value for the corresponding pixel may be calculated, and when the calculated difference value is equal to or greater than a fixed value, a bit in the data page may be determined to be an error bit.

By applying the variable of each generation generated through the genetic algorithm to the fitness function, the number of error bits may be calculated. The variable of the generation in which the number of error bits is the smallest may be set as an optimal threshold value.

Then, the output value of each pixel of the data page may be determined based on the calculated optimal threshold value (S440). Specifically, the optimal threshold value includes a plurality of threshold values, and the threshold value close to the calculated luminance value may be determined as the output value.

For example, when the optimal threshold value has four levels, a threshold value closest to the calculated luminance value of each pixel in the data page among the values of R1, R2, R3, and R4 calculated as the optimal threshold value may be determined as the output value.

Further, reproduction data according to the determined output value of each pixel may be decoded and output (S450). Meanwhile, description of the genetic algorithm will be described in detail with reference to FIG. 5.

Figure 5:
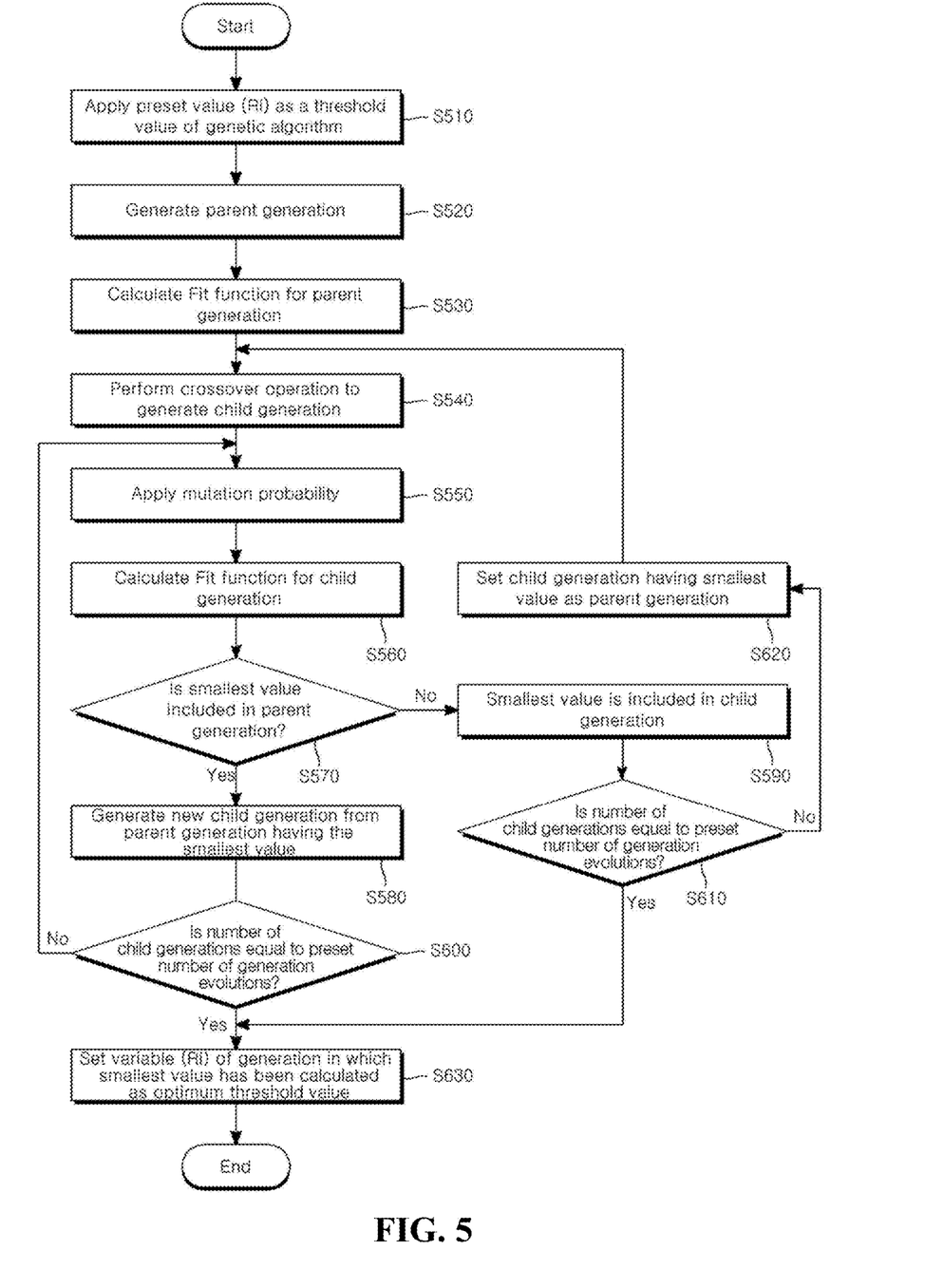
FIG. 5 is a flowchart illustrating optimal threshold value calculation using a genetic algorithm in a holographic data reproduction apparatus according to an embodiment of the present invention.

FIG. 5 is a flowchart illustrating an optimal threshold value calculation using a genetic algorithm for the holographic data reproduction apparatus according to an embodiment of the present invention. Referring to FIG. 5, a generation set including a population set which is set according to each pixel in the data page and a plurality of preset threshold values set for each pixel is set, and the plurality of preset threshold values are applied as an initial value of the variable (Ri) of the population set (S510). Here, the generation set may include a parent generation and child generation of the genetic algorithm, and the population set may be a set of variables (Ri) included in each generation set.

Then, the parent generation is generated (S520) and the fitness function for the parent generation is calculated (S530).

A crossover operation is performed on the parent generation to generate a child generation (S540). A mutation probability is applied to the generated child generation (S550), and a fitness function for the child generation to which the mutation probability has been applied is calculated (S560).

Then, a generation having a smallest value among values of the fitness functions calculated in the parent generation and the child generation is determined so as to determine a shift in generation. Here, when the smallest value is calculated in the parent generation (S570: Y), a new child generation may be generated from the parent generation having the smallest value (S580). Then, it is determined whether the number of child generations is equal to a preset number of generation evolutions (S600). In this case, if the number of child generations is not equal to the preset number of generation evolutions (S600: N), the steps from step S550 are performed again.

On the other hand, when the smallest value is calculated in the child generation (S590), it is determined whether the number of child generations is equal to a preset number of generation evolutions (S610). In this case, if the number of child generations is not equal to the preset number of generation evolutions (S610: N), the child generation having a smallest value is set as a parent generation (S620), and the steps from step S540 are performed again.

Meanwhile, if the number of the child generations is equal to the preset number of generation evolutions (S600: Y and S610: Y), the variable (Ri) of the generation in which the smallest value has been calculated may be set as an optimal threshold value (S630).

Here, the parent generation may be selected using a roulette wheel scheme, and the parent generation and the child generation may be selected using a uniform distribution crossover scheme. Thus, by applying the optimal threshold value calculated using the genetic algorithm, it is possible to minimize the bit error rate (BER) and accurately reproduce the holographic data.

While the embodiment of the present invention has been described with reference to the accompanying drawings, it will be understood by those skilled in the art to which the present invention pertains that the present invention may be embodied in other specific forms without changing the technical spirit and essential characteristics of the present invention. Therefore, the embodiment described above is illustrative in all aspects, but is not limited.

What is claimed is:

1. A holographic data reproduction apparatus comprising:
   a charged-coupled device (CCD) that photographs diffracted-light from a recording medium irradiated with reference light, wherein the diffracted-light corresponds to a data page;
   an operation unit that calculates an optimal threshold value by applying a fitness function (Fit) to a genetic algorithm for detecting a number of error bits of the data page corresponding to the diffracted-light;
   a control unit that determines an output value of each pixel of the data page based on the optimal threshold value; and
   a decoding unit that decodes and outputs reproduction data according to the output value of the each pixel.

2. The holographic data reproduction apparatus of claim 1, wherein the holographic data reproduction apparatus further comprises a storage unit that stores a plurality of preset threshold values for determining the output value of the each pixel of the data page,
   wherein the operation unit sets a generation set including a population set that is set according to the each pixel of the data page and the plurality of preset threshold values for the each pixel; repeatedly performs a generation set selection, a crossover operation, and a mutation operation; and ends the genetic algorithm when a number of one or more of a child generation is equal to a preset number of generation evolutions.

3. The holographic data reproduction apparatus of claim 2, wherein the operation unit applies the plurality of preset threshold values as an initial value of a variable (Ri) of the population set to generate a parent generation, and calculates the fitness function for the parent generation.

4. The holographic data reproduction apparatus of claim 3, wherein the operation unit performs the crossover operation on the parent generation to generate the child generation, and applies a mutation probability to the child generation to calculate the fitness function.

5. The holographic data reproduction apparatus of claim 4, wherein the operation unit determines a generation having a smallest value among values calculated by the fitness function in the parent generation and the child generation to determine a shift in generation.

6. The holographic data reproduction apparatus of claim 5, wherein, when the smallest value is calculated in the parent generation, the operation unit sets a first child generation among the parent generation having the smallest value, and the operation unit sets a second child generation having the smallest value among the first child generation as a first parent generation to generate a second child generation, when the smallest value is calculated in the first parent generation.

7. The holographic data reproduction apparatus of claim 6, wherein the operation unit calculates a luminance value for the each pixel of the data page captured by the CCD, and
wherein when the genetic algorithm ends, the control unit sets a variable (Ri) of a smallest value generation in which the smallest value is calculated as the optimal threshold value, compares the optimal threshold value with the luminance value, and determines the optimal threshold value close to the luminance value as the output value.

8. The holographic data reproduction apparatus of claim 1, wherein the operation unit calculates the fitness function for the data page using an equation below, $$Fit(Ri)=\text{count}(Error/page),\qquad\text{[Equation]}$$

where Ri denotes a population set variable of the genetic algorithm, page denotes the data page, Error denotes an error bit in the data page to which a value of the variable Ri is applied, and count ( ) denotes a number of measurements.

9. The holographic data reproduction apparatus of claim 8, wherein the operation unit calculates a luminance value for the each pixel of the data page corresponding to the diffracted-light, and
the control unit compares the luminance value with the value of the variable Ri, and determines that a bit in the data page is an error bit when a difference value between the luminance value and the value of the variable Ri is equal to or greater than a predetermined value.

10. A holographic data reproduction method comprising:
photographing diffracted-light from a recording medium irradiated with reference light, wherein the diffracted-light corresponds to a data page;
applying a fitness function (Fit) to a genetic algorithm to calculate an optimal threshold value, wherein the fitness function detects a number of error bits of the data page corresponding to the diffracted-light;
determining an output value of each pixel of the data page based on the optimal threshold value; and
decoding and outputting reproduction data according to the output value of the each pixel.

11. The holographic data reproduction method of claim 10, wherein the applying further comprises:
setting a generation set including a population set that is set according to the each pixel of the data page and a plurality of preset threshold values for the each pixel;
applying the plurality of preset threshold values as an initial value of a variable (Ri) of the population set to generate a parent generation, and calculating the fitness function for the parent generation;
performing a crossover operation on the parent generation to generate a child generation;
applying a mutation probability to the child generation to calculate the fitness function; and
determining a generation having a smallest value among values calculated by the fitness function in the parent generation and the child generation to determine a shift in generation.

* * * * *